UNITED STATES PATENT OFFICE.

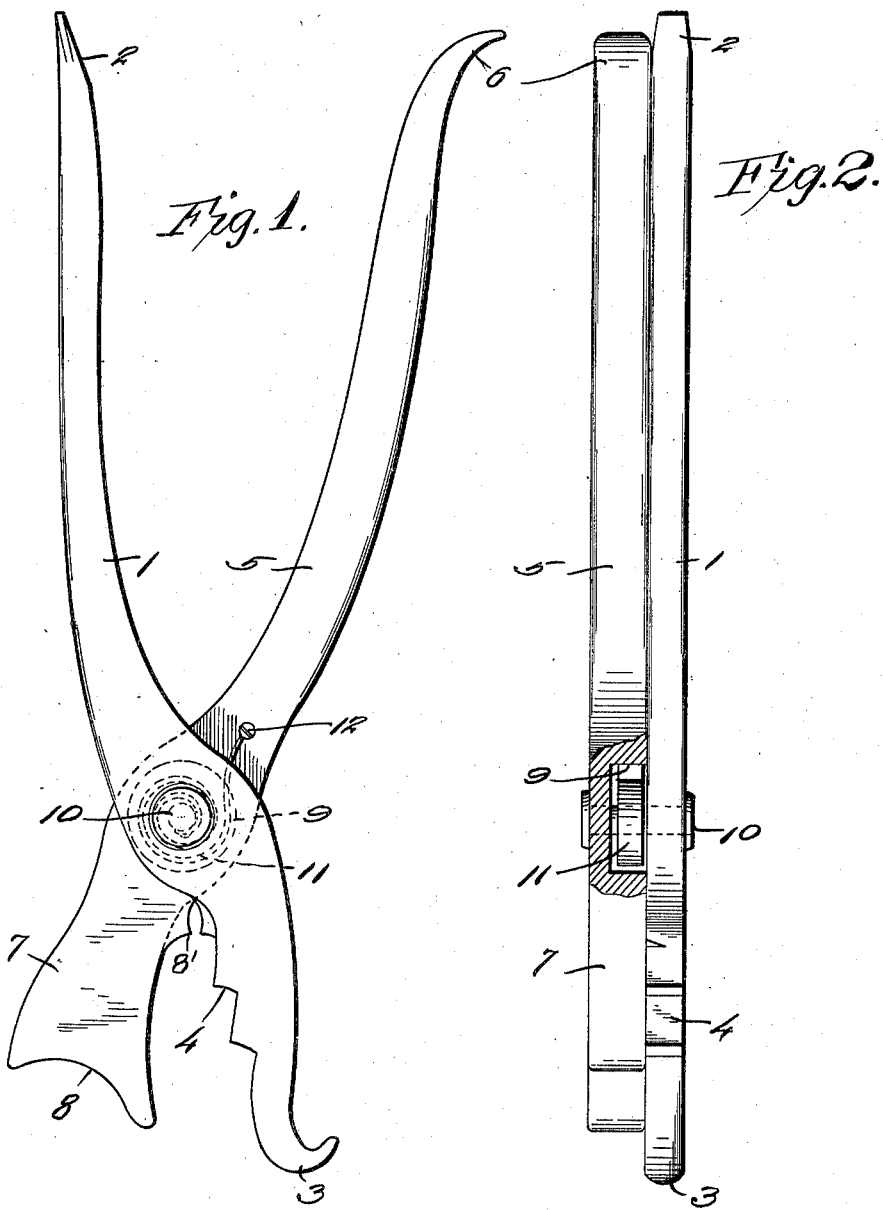

WILLIAM R. WELDIE, OF NORTH EAST, MARYLAND.

PLIERS.

1,312,148. Specification of Letters Patent. Patented Aug. 5, 1919.

Application filed October 2, 1917. Serial No. 194,376.

*To all whom it may concern:*

Be it known that I, WILLIAM R. WELDIE, a citizen of the United States, residing at North East, in the county of Cecil and State of Maryland, have invented certain new and useful Improvements in Pliers, of which the following is a specification.

My invention relates to new and useful improvements in pliers and particularly to the type adapted to be used in removing or replacing tires on automobile wheels, the pliers consisting of a pair of pivoted jaws, one of which is shorter than the other, and the ends of said jaws are formed to the configuration of such portions of the tire and rim that will be engaged by the pliers when removing or replacing a tire upon a wheel. The shorter jaw is provided with an extension which is adapted to be engaged with the bead of the tire, and which is formed to engage the bead in such a manner as to permit the extension to guide the tire to position in replacing the tire and which may aid in gripping the bead of the tire in removing the tire.

Another object of my invention is to provide means wholly associated with one of the jaws for normally retaining the jaws of the pliers in open position.

Other objects and advantages will be apparent during the course of the following description.

In the accompanying drawing forming a part of the description and wherein like numerals are employed to designate like parts throughout the same, Figure 1 is a side elevation of the invention, and Fig. 2 is a top view of the same, parts thereof being broken away to show the spring mechanism of the jaws.

In the drawings wherein for the purpose of illustration is shown a preferred embodiment of my invention, the numeral 1 designates a handle having arranged upon one end thereof a flattened end 2 to form a screw-driver, and the opposite end thereof provided with a downwardly curved hook 3 adapted to embrace a portion of an automobile rim. This jaw is also provided with a serrated inner edge 4 for a purpose which will be hereinafter set forth.

The coacting handle 5 is provided at one end with a curved and flattened portion 6, which is employed to be inserted between the tire and felly of a wheel for removing the tire therefrom. The opposite end of this handle is provided with a jaw 7, substantially shorter and twice as wide as its coacting jaw, and this jaw is provided upon its outer end with a concave surface 8, which is adapted to embrace a portion of a tire when the tool is used to replace a tire upon a wheel. This concave portion 8 is arranged diagonally of the end of the jaw 7 to provide an outwardly projecting portion 8' which extends longitudinally of the axis of the tool. This extension 8' is arranged adjacent the co-acting jaw, and is adapted for engagement with the bead of the tire. A recess 9, circular in cross-section, is provided in the inner face of the handle 5. The inner side of the jaw 7 is substantially flat in order that a nut may be clamped between the serrated portion 4 of the coacting jaw in order that the tool may be used as a wrench.

These jaws are pivoted together by the pin 10 and are normally held in an open position by the coil spring 11 which is adapted to be received in the recess 9 and has one end thereof secured to the pin, while the main portion of the spring is wound around the pin and has its opposite end secured to the jaw 5 by means of the screw 12.

In removing a tire from the rim, the hook 3 is forced down between the tire bead and the wheel rim so as to engage the rim. The pliers are then operated so that the concave portion of the jaw 8 and the extension 8' engage the side of the tire. The handle 5 of this jaw is actuated to disengage the bead of the tire from the rim, then the pliers may be actuated so that the jaws thereof grip the tire bead between the inner surface of the extension 8' and the inner surface of the jaw 3. The pliers as a whole are then pulled outwardly of the wheel to entirely disengage the outer bead of the tire from the rim.

To use this tool as a tire replacer, the hook 3 is positioned on the rim of an automobile wheel so as to embrace the same. A pressure is then exerted upon the underside of the handle 1 which urges the jaw 7 and the concave surface thereof into engagement with a portion of the tire bead. By closing the handles 1 and 5 and exerting an upward pressure thereon, the tire is gradually slipped upon the rim of the wheel.

It is to be understood that the form of my invention herewith shown and described is to be taken as a preferred example of the same and that various changes in the shape, size and arrangement of parts may be resorted to without departing from the spirit of the invention or the scope of the subjoined claim.

Having described my invention, I claim:

A tire setting and replacing tool comprising a pair of crossed pivoted handles, a jaw upon the forward end of each handle, one jaw being shorter than the other, the transverse end of the short jaw being forwardly and diagonally concaved to conform to a portion of a tire, a forwardly extending portion on said jaw adjacent the co-acting jaw and extending approximately longitudinally of the axis of the tool, and the co-acting longer jaw extending forwardly and beyond the shorter jaw and being provided with a hooked end curved away from the short jaw whereby said hooked end may be engaged with a rim of a wheel.

In testimony whereof I affix my signature in presence of two witnesses.

WILLIAM R. WELDIE.

Witnesses:
W. T. WELDIE,
L. V. WELDIE.

Copies of this patent may be obtained for five cents each, by addressing the "Commissioner of Patents, Washington, D. C."